US006287691B1

(12) United States Patent
Decaumont et al.

(10) Patent No.: US 6,287,691 B1
(45) Date of Patent: Sep. 11, 2001

(54) ELECTRICAL WINDING, AND A TRANSFORMER AND AN ELECTRIC MOTOR INCLUDING SUCH A WINDING

(75) Inventors: Anne Decaumont, Bretigny sur Orge; Denis Cottevieille, Montreuil sous Bois; Nadine Rieux, Antony; Nadine Foulon, Paris, all of (FR)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/318,749

(22) Filed: May 26, 1999

(30) Foreign Application Priority Data

May 27, 1998 (FR) ........................................ 98 06647

(51) Int. Cl.[7] ........................ B32B 15/00; H01B 7/00

(52) U.S. Cl. ........................ 428/379; 428/372; 428/383; 428/389; 428/377; 174/110 SR; 174/110 A; 174/120 SR

(58) Field of Search ........................ 428/372, 379, 428/383, 389, 377; 252/500; 174/110 SR, 110 A

(56) References Cited

U.S. PATENT DOCUMENTS 4,983,690 * 1/1991 Cameron et al. .................... 525/436
5,353,350 * 10/1994 Unsworth et al. .................... 380/3
5,422,462 * 6/1995 Kishimoto .................... 219/545
5,463,014 * 10/1995 Epstein et al. .................... 528/210
5,514,337 * 5/1996 Groger et al. .................... 422/82.08
5,516,983 * 5/1996 Kishimoto et al. .................... 174/1
5,563,182 * 10/1996 Epstein et al. .................... 522/146

FOREIGN PATENT DOCUMENTS 42 18 928 A1 12/1993 (DE) .
44 38 187 A1 5/1996 (DE) .
0 798 950 A2 10/1997 (EP) .
2000030926 * 1/2000 (JP) .
WO 89/01694 * 2/1989 (WO) .

OTHER PUBLICATIONS

Patent Abstracts of Japan, vol. 012, No. 135 (E–604) Apr. 23, 1998 corresponding to JP 62 260310 A (Toshiba Corp.) dated Nov. 12, 1987.

* cited by examiner

*Primary Examiner*—Cynthia H. Kelly
*Assistant Examiner*—J. Gray

(57) ABSTRACT

An electrical winding made by winding a coated electrical conductor to form a plurality of turns, the coating comprising a polymer matrix and at least one material having non-linear resistance, according to the invention, the material having non-linear resistance is a doped or non-doped conductive polymer.

12 Claims, 1 Drawing Sheet

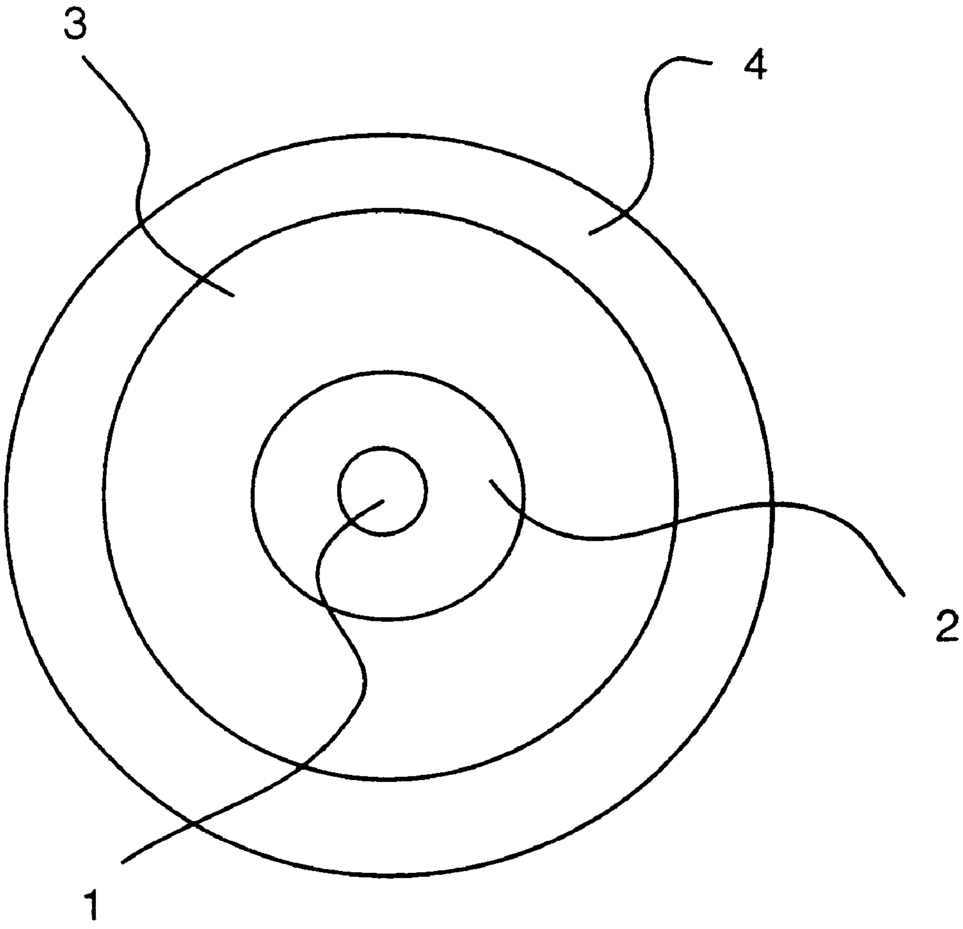
3
4
2
1

ELECTRICAL WINDING, AND A TRANSFORMER AND AN ELECTRIC MOTOR INCLUDING SUCH A WINDING

The present invention relates to the field of electrical windings, and in particular rotor or stator windings for electric motors.

BACKGROUND OF THE INVENTION

When such windings are excited by signals having steep fronts, as opposed to signals that are substantially sinusoidal, the very high transient voltages cause accelerated aging of the insulating varnish surrounding the conductor. Charge accumulation gives rise to insulation breakdown phenomena that considerably reduce the lifetime of such windings, and thus of the electric motors.

To remedy that drawback, proposals are made in the prior art for a solution consisting in surrounding the conductor in a layer of insulation that is not enameled.

For example, PCT patent application WO 96/42089 discloses a conductor coated in an insulating layer whose resistance varies with excitation voltage. The examples of insulating layers described in that prior art document are matrices that include metal oxides. That solution does not enable the electric charge which forms during voltage transience to be evacuated.

To oppose the accelerated degradation of the insulating layer due to breakdown of the coating on the conductor, there exist composite coatings, such as that described in DE 4438187, comprising a polymer matrix including an inorganic filler having non-linear resistance, such as zinc oxide or silicon carbide.

The term "material having non-linear resistance" is used to mean a material that is of low conductivity in the absence of an electric field, and whose resistance is a non-linear function of the electric field to which said material is subjected or of the potential difference applied to said material. The resistance of such materials diminishes as the voltage applied thereto increases.

Theoretically, such a composite material having a polymer matrix and an inorganic filler of non-linear resistance makes it possible to decrease the risk of breakdown during voltage transients. Nevertheless, the very different physical characteristics of the components of the composite material (inorganic filler and organic matrix) give rise to problems of homogeneity. These problems of homogeneity significantly limit the performance expected of that type of composite material. Another problem with that type of very heterogeneous material is poor reproducibility. Reproducibility is the criterion whereby a substance can easily and economically be manufactured in large quantity with good reproduction of the characteristics that are obtained in the laboratory. In the context of industrial manufacture, poor reproducibility is completely unacceptable.

OBJECT AND SUMMARY OF THE INVENTION

The object of the present invention is to propose an electrical winding having a coating of composite material of non-linear resistance that mitigates the above drawbacks.

To this end, the invention provides an electrical winding made by winding a coated electrical conductor to form a plurality of turns, the coating comprising a polymer matrix and at least one material having nonlinear resistance, wherein the material having non-linear resistance is a doped or non-doped conductive polymer.

In order to improve the homogeneity of the coating significantly, the matrix and the conductive polymer use a common solvent.

In an embodiment, the coating is constituted by alternating insulating layers and layers of materials having non-linear resistance.

In another embodiment, the coating is constituted by an inner insulating layer and an outer insulating layer, with an intermediate layer of material having non-linear resistance.

In another embodiment, the coating presents a concentration gradient of materials having non-linear resistance.

In another embodiment, the coating is constituted by a single layer selected from materials having non-linear resistance.

The material having non-linear resistance can be PANi and derivatives thereof.

The concentration of conducive polymer can lie in the range 1% to 30% by volume.

In particular, the concentration of conductive polymer lies in the range 15% to 18% by volume.

The material having non-linear resistance may also comprise particles of doped zinc oxide.

The conductive polymer is a polymer selected from polyaniline, N-phenyl P-phenylene diamine, a polythiophene, a polyarylthiophene, a polypyrole, a polyarylvinylene, a poly(P-phenylene sulfide), a poly(P-phenylene), a paraphenylene vinylene (PPV), copolymers thereof, and mixtures thereof. More preferably, the first polymer is a self-doped copolymer selected from a copolymer of n-phenyl P-phenylene diamine and an aminonaphthalene sulfonic acid, a copolymer of aniline and an amino-naphthalene sulfonic acid, a copolymer of aniline and 3-(3-amino benzyloxy)-1-propane sulfonic acid, a copolymer of aniline and 3-(2-amino phenoxy)-1-propane sulfonic acid, a copolymer of aniline and 4-(2-amino phenoxy)-1-butane sulfonic acid, a copolymer of aniline and 1-amino 2,6-bis (4-sulfobutoxy) benzene, and mixtures thereof. The synthesis of these copolymers is described in European patent EP-0 512 926, published on Nov. 11, 1992. By way of example, the dopant can be hydrochloric acid (HCl), sulfuric acid ($H_2SO_4$), camphorsulfonic acid, or indeed a substituted sulfonic acid.

A patent published under number FR 2 719 595 describes crystalline compounds with ferromagnetic properties comprising metallic salts included in copolymers in which the elementary structural unit comprises, side-by-side, a link of a first group of aminoaromatic compounds derived from 1-naphthylamine and the corresponding oxidized forms, and a link of a second group of substituted aminoaromatic compounds selected from substituted amine compounds comprising at least two condensed benzene rings, substituted polycyclic compounds comprising at least one aniline structural unit in their structure, aniline-derivitive compounds carrying a substituent connected to the ring by an ethynylidene or paraphenylene link, and the corresponding oxidized compounds.

BRIEF DESCRIPTION OF THE DRAWING

The invention will be better understood on reading the following description, with reference to the sole accompanying FIGURE which is a section view of a wire for making a winding of the invention.

MORE DETAILED DESCRIPTION

The winding of the invention is constituted by a plurality of turns formed by winding a wire having the structure which is shown in section in the sole FIGURE.

The wire is constituted by a non-enameled conductive core 1 surrounded by a three-layer coating.

The first layer 2 is an insulating layer, e.g. an insulating varnish as is commonly used for insulating conductive wires.

The second layer 3 is a layer of a material having non-linear resistance.

The outer, third layer 4 is, like the inner layer 2, formed by an insulating varnish as commonly used for insulating conductive wires.

The intermediate layer 3 constitutes an equipotential screen for conveying the charge which forms during fast transients, particularly when the winding is fed with high periodic voltages whose signals have steep fronts.

The intermediate layer has high resistance when the electric field due to the current flowing along the conductive wire 1 is low. However, when the electric field increases, the intermediate layer becomes conductive and contributes to limiting the risk of the insulating layer breaking down.

The non-linear material is constituted by a matrix containing a doped or non-doped conductive polymer, in particular polyaniline at concentrations of about 1% to by volume, and preferably of about 15% to 18% by volume.

The non-linear material can be selected from crystalline compounds with ferromagnetic properties comprising metallic salts included in copolymers in which the elementary structural unit comprises, side-by-side, a link of a first group of aminoaromatic compounds derived from 1-naphthylamine and the corresponding oxidized forms, and a link of a second group of substituted aminoaromatic compounds selected from substituted amine compounds comprising at least two condensed benzene rings, substituted polycyclic compounds comprising at least one aniline structural unit in their structure, aniline-derivative compounds carrying a substituent connected to the ring by an ethynylidene or paraphenylene link, and the corresponding oxidized compounds.

The non-linear material may also comprise metallic oxide particles embedded in the matrix, in particular particles of doped zinc oxide.

The present invention can be varied in numerous ways by the person skilled in the art without going beyond the invention. In particular, without going beyond the invention, it is possible to use an organic material having properties that are non-linear in an electric field.

What is claimed is:

1. An electrical winding made by winding a coated electrical conductor to form a plurality of turns, the coating comprising a polymer matrix and at least one material having non-linear resistance, wherein the material having non-linear resistance is a doped or non-doped conductive polymer.

2. An electrical winding according to claim 1, wherein the matrix and the conductive polymer use a common solvent.

3. An electrical winding according to claim 1, wherein the coating is constituted by alternating insulating layers and layers of materials having non-linear resistance.

4. An electrical winding according to claim 1, wherein the coating is constituted by an inner insulating layer and an outer insulating layer, with an intermediate layer of material having non-linear resistance.

5. An electrical winding according to claim 1, wherein the coating presents a concentration gradient of materials having non-linear resistance.

6. An electrical winding according to claim 1, wherein the coating is constituted by a single layer selected from materials having non-linear resistance.

7. An electrical winding according to claim 1, wherein the material having non-linear resistance is PANi and derivatives thereof.

8. An electrical winding according to claim 1, wherein the concentration of conductive polymer lies in the range 1% to 30% by volume.

9. An electrical winding according to claim 1, wherein the concentration of conductive polymer lies in the range 15% to 18% by volume.

10. An electrical winding according to claim 1, wherein the material having non-linear resistance further comprises particles of doped zinc oxide.

11. An electrical winding according to claim 10, wherein the concentration of zinc oxide lies in the range 1% to 30% by volume.

12. An electrical winding according to claim 10, wherein the concentration of zinc oxide lies in the range 15% to 18% by volume.

* * * * *